(12) United States Patent
Husted (10) Patent No.: US 7,386,063 B1
(45) Date of Patent: Jun. 10, 2008

(54) VOTING BLOCK FOR IDENTIFYING WLAN SIGNAL MODULATION TYPE

(75) Inventor: Paul J. Husted, San Jose, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 798 days.

(21) Appl. No.: 10/698,666

(22) Filed: Oct. 31, 2003

(51) Int. Cl.
*H04L 27/00* (2006.01)

(52) U.S. Cl. ............... 375/316; 375/341; 375/262; 375/340; 375/260; 375/368; 455/219; 455/232.1; 455/234.1; 455/234.2; 455/226.1

(58) Field of Classification Search ........... 375/341, 375/345, 262, 137, 355, 316, 340, 260, 343, 375/365, 346, 368, 234, 347, 130, 324
See application file for complete search history.

(56) References Cited

U.S. PATENT DOCUMENTS

| | | | | |
|---|---|---|---|---|
| 4,166,980 | A * | 9/1979 | Apostolos et al. | 375/316 |
| 4,845,707 | A * | 7/1989 | Isaacson et al. | 370/480 |
| 5,323,422 | A * | 6/1994 | Ushirokawa | 375/232 |
| 5,517,524 | A * | 5/1996 | Sato | 375/230 |
| 5,644,567 | A * | 7/1997 | Ukeda | 375/232 |
| 5,644,597 | A * | 7/1997 | Ueda | 375/232 |
| 6,463,107 | B1 * | 10/2002 | Lindoff et al. | 375/343 |
| 6,571,083 | B1 * | 5/2003 | Powell et al. | 455/69 |
| 6,690,746 | B1 * | 2/2004 | Sills et al. | 375/316 |
| 6,957,086 | B2 * | 10/2005 | Bahl et al. | 455/557 |
| 7,161,987 | B2 * | 1/2007 | Webster et al. | 375/260 |
| 2004/0030530 | A1 * | 2/2004 | Li et al. | 702/179 |
| 2004/0097207 | A1 * | 5/2004 | Sandaralingam | 455/205 |

FOREIGN PATENT DOCUMENTS

WO    WO 99/39484    *    8/1999

\* cited by examiner

*Primary Examiner*—Chieh M. Fan
*Assistant Examiner*—Siu M Lee
(74) *Attorney, Agent, or Firm*—Bever, Hoffman & Harms, LLP; Jeanette S. Harms (57) ABSTRACT

A WLAN device operating in an 802.11g mode can receive signals of different modulations. A technique is provided that quickly and accurately identifies signals of different modulation types when received by the WLAN device. This technique includes beginning demodulation of the received signal using components associated with potential types of modulation. One or more identification values can be provided to a voting block for potential types of modulation based on the received signal. The voting block can advantageously determine the most probable modulation based on such identification value(s). At this point, components associated with the determined modulation can be used to correctly decode the received signal and components not associated with the determined modulation can be deactivated, thereby saving valuable power resources in the device.

21 Claims, 8 Drawing Sheets

VOTING BLOCK FOR IDENTIFYING WLAN SIGNAL MODULATION TYPE

BACKGROUND OF THE INVENTION

1. Field of the Invention

The present invention relates to a wireless local area network (WLAN) device that can receive signals of multiple modulation types. In particular, the present invention relates to a voting block that quickly and accurately identifies the modulation type of the signal.

2. Description of the Related Art

Wireless local area networks (WLANs) are becoming increasingly popular as communication networks. The IEEE 802.11 standards provide guidelines for the operation of devices operating in WLANs. Specifically, the 802.11a standard defines communication in the 5 GHz band using data rates of 6, 12, 18, 24, 36, and 54 Mbps. The 802.11b standard defines communication in the 2.4 GHz band using data rates of 1, 2, 5.5, and 11 Mbps. A recently ratified addition to the 802.11 standards, called the 802.11g standard, uses the high data rates of 802.11a in the frequency band of 802.11b, i.e. 2.4 GHz.

The 802.11g standard envisions that 802.11b devices can communicate with 802.11g devices that operate in the same WLAN. Note that as used herein, the term "device" can refer to either an access point or a client.

To ensure backwards compatibility with 802.11b devices while allowing data rate increases, the 802.11g standard incorporates the modulation schemes from both the 802.11a and 802.11b standards. In general, modulation refers to the addition of information to a carrier. Typical modulation techniques include frequency modulation wherein the frequency of the carrier waveform is varied.

The 802.11b standard uses a modulation scheme called complementary code keying (CCK) (note that 802.11b can also use Barker code chipping at the 1 and 2 Mbps rates) whereas the 802.11a standard uses another modulation scheme called orthogonal frequency division multiplexing (OFDM). The OFDM scheme involves encoding information upon a plurality of sub-carriers, which are then modulated onto a carrier signal. The proposed 802.11g standard can use other modulation schemes in addition to CCK and OFDM. For example, a modified OFDM scheme called Extended Range (XR), which has been developed by Atheros Communications, Inc. to operate concurrently with the 802.11a, 802.11b, and 802.11g standards, can also be used.

Of importance, the 802.11g standard provides no implementation requirements as to how a modulation type should be identified. Therefore, a need arises for a technique that quickly and accurately identifies signals of different modulations when received by the WLAN device.

SUMMARY OF THE INVENTION

A wireless local area network (WLAN) device operating in an 802.11g mode can receive signals of different modulations. These modulations can include, for example, OFDM, CCK, or proprietary modulation schemes. To efficiently decode these signals while conserving valuable power resources in the device, it would be highly desirable to know what modulation is being used as soon as possible. Therefore, a technique is provided that quickly and accurately identifies signals of different modulations when received by the WLAN device.

In accordance with one feature of the invention, a method of determining a modulation type of a received signal can include beginning demodulation of the received signal using components associated with one or more potential types of modulation. Identification values can be provided to a voting block for potential types of modulation based on the received signal. The voting block can advantageously determine the most probable modulation based on such identification values, thereby allowing the system to use the correct decoder to decode the received signal. The output of the voting block can be advantageously used for deactivating components in the device not associated with the identified modulation.

The identification value can include a correlation value based on characteristics of the type of modulation. Specifically, each type of modulation has inherent characteristics that can be used when searching for a packet. The inherent characteristics could be found by a self-correlating technique (e.g. identifying unique signal patterns provided within the packet corresponding to a particular type of modulation), a cross-correlating technique (e.g. comparing signals in a packet to a known pattern identified for a type of modulation), or a combination of self- and cross-correlating (dual correlating) techniques.

The identification value for a weak signal can include a normalized correlation value based on characteristics of the type of modulation normalized by the raw power in the signal. The identification value for a strong or intermediate strength signal can include an absolute modulation-specific correlation value, also called a modulation-specific received signal strength indicator (RSSI) herein. An RSSI can be computed by performing a noise floor measurement and then subtracting the measured noise floor power from the measured received signal power, wherein all values are on a decibel (dB) scale. The received signal power can be defined as the variable gain subtracted from the sum of squares power after filtering (i.e. fir_pwr–variable gain). Thus, an RSSI can be represented by the following equation: (fir_pwr–variable gain)–noise floor. Note that these measurements include values that have been converted to the log domain (e.g. via look-up tables).

In one embodiment, for a strong or intermediate strength signal, the identification value can include a bias value, wherein the bias value adjusts a probability of choosing a particular modulation. The bias value can be based on an environment for the received signal, e.g multipath, which can affect modulated signals in different ways.

In one embodiment, to determine whether a signal is truly weak or is of intermediate strength, a raw RSSI can be compared to a threshold RSSI. The raw RSSI refers to the strength of the signal without reference to a particular modulation. In one embodiment, the threshold RSSI could be set by a user of the WLAN device.

A system for determining a modulation of a received signal in a receiver is also provided. The system can include means for providing identification values for potential types of modulation based on the received signal. The system can further include means for determining the most probable modulation based on such identification values.

In one embodiment including an appropriately fast microprocessor, a computer software program for determining the modulation type of a received signal can also be provided. The program can include code for providing identification values for potential types of modulation based on the received signal. The program can further include code for determining the most probable modulation based on such identification values.

DETAILED DESCRIPTION OF THE FIGURES

WLAN Receiver: Overview

Figure 1A:
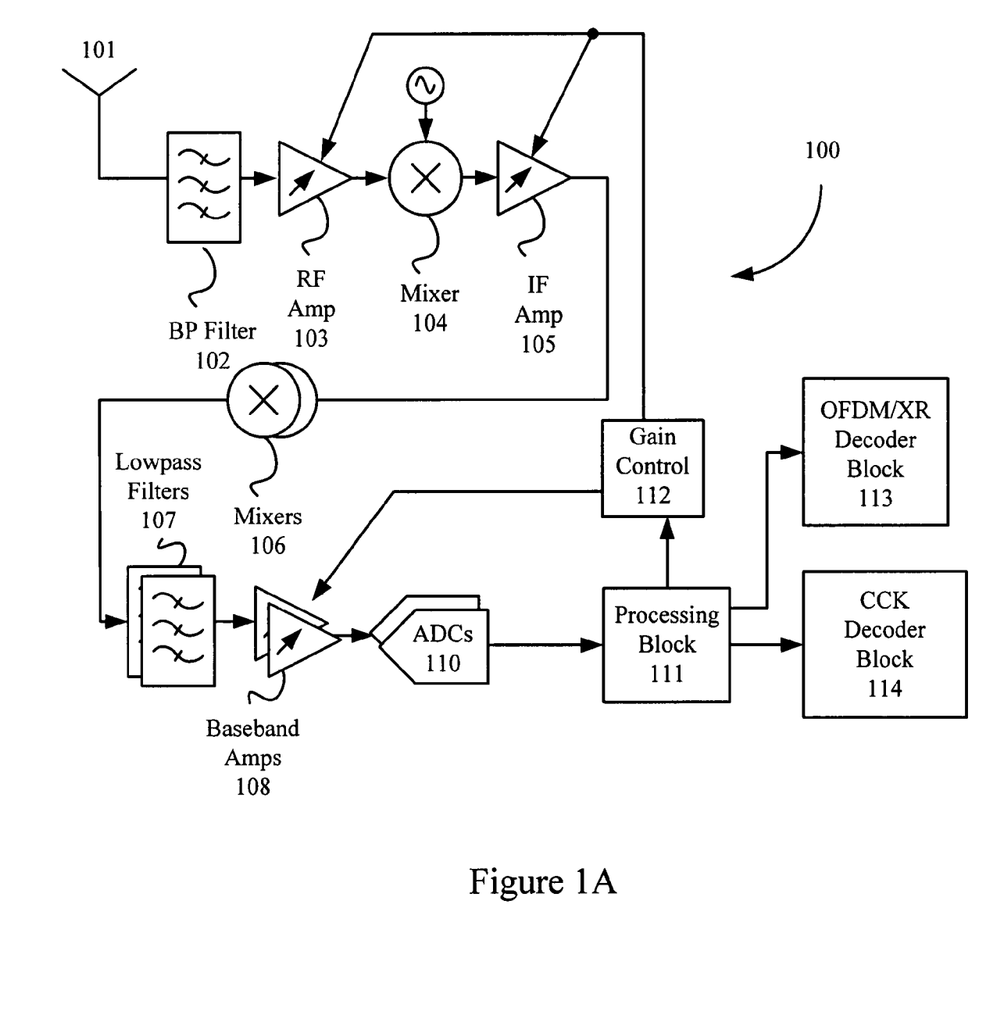
FIG. 1A illustrates a simplified receiver of a WLAN device, wherein a processing block therein can facilitate identifying the modulations of detected signals.

FIG. 1A illustrates a simplified receiver 100 for receiving signals in a WLAN environment. In receiver 100, a bandpass filter 102 receives the incoming signals from an antenna 101 and outputs a predetermined band of frequencies (while excluding those frequencies higher and lower than the predetermined band). A variable RF amplifier 103 can provide an initial amplification to that predetermined band of frequencies. A mixer 104 converts those amplified signals into intermediate frequency (IF) signals, which are then amplified by an IF amplifier 105.

At this point, mixers 106 and low pass filters 107 (including both I and Q branches) can generate signals in the desired channel (called the baseband signals). Amplifiers 108 then amplify these baseband signals. Analog to digital converters (ADCs) 110 (provided for both the I and Q branches of low pass filters 107) transform the amplified baseband signals into digital signals that can be analyzed by a processing block 111. Gain control circuit 112 detects the magnitude of the digital signal, as measured by processing block 111, and uses the detected magnitude to adjust the gains of RF amplifier 103, IF amplifier 105, and BB amplifiers 108.

Of importance, processing block 111 determines the modulation type of the detected signal and provides this determination to both an OFDM/XR decoder 113 and a CCK decoder 114 for system optimization, thereby allowing the correct decoder to recover the originally transmitted signal. Moreover, after the modulation type of the signal is determined, various components of processing block 111 as well as one of OFDM/XR decoder 113 and CCK decoder 114 can be turned off, thereby decreasing use of expensive energy resources in the system.

OFDM decoder 113 and CCK decoder 114 can be implemented using conventional decoders. A generic conventional decoder could include a synchronizing block for time and frequency. In one embodiment, the synchronizing block could include a rotator for receiving the output of processing block 111 and providing a frequency offset correction to the processed signal, if necessary. The synchronizing block could further include a signal timing circuit for determining symbol boundaries and providing a timing output. The method for determining the frequency offset and timing values may be different for each modulation type, and the internal method of describing these values may be different as well. However, the general principal of finding timing alignment and correcting frequency offset still apply. The method for correcting these offsets may be shared or not between implementations if possible, but is not necessary. The timing output can be used by other components. For example, the timing output could be provided to a maximum-likelihood estimator and a Barker correlator in a CCK decoder or to an FFT, frequency equalizer, and a Viterbi decoder in an OFDM decoder.

Detection of Weak Versus Strong Signals

Gain control 112 attempts to adjust the gain of amplifiers 103, 105, and 108 so that the size of the received signal at ADCs 110 is neither too small nor too large, either of which can undesirably result in unreliable identification of the signal. Generally, high and low thresholds can be established, wherein if a detected signal fails to fall within the two thresholds, then the gain of these variable amplifiers can be adjusted to bring that signal back into the desired range. In one embodiment, amplifiers 103, 105, and 108 can be adaptively set to a relatively high gain to ensure that even thermal noise at antenna 101 can be detected at ADCs 110.

In this state, if a weak signal is received, then the amplified signal at ADCs 110 is not substantially greater than the amplified thermal noise from antenna 101. In one embodiment, a power measurement block in processing block 111 (described in reference to FIG. 1B) can determine whether the received signal may be characterized as weak, strong, or intermediate (i.e. somewhere between the two extremes). This power measurement block can then provide its output to gain control 112 to ensure proper adjustment of the gains of variable amplifiers 103, 105, and 108.

In one embodiment, a first, coarse gain adjustment can be made based on the signal as received by processing block 111. If the subsequent signal does not fall within the established low and high thresholds, then additional coarse gain adjustments can be performed. These adjustments can continue until either the signal is within the established low and high thresholds or until the gain cannot change any further. At this point, fine gain adjustments can be made based on measurements taken after processing within processing block 111.

After fine gain adjustments have been made, the search mode is complete and signal identification (also called the demodulation mode) can begin. In accordance with one feature of the invention, described in reference to FIGS. 4A and 4B, processing block 111 can identify the modulation type of the signal using a normalized correlation value or an absolute modulation-specific correlation value of the detected signal.

Processing Block Includes Packet Detection and Voting Capability

Figure 1B:
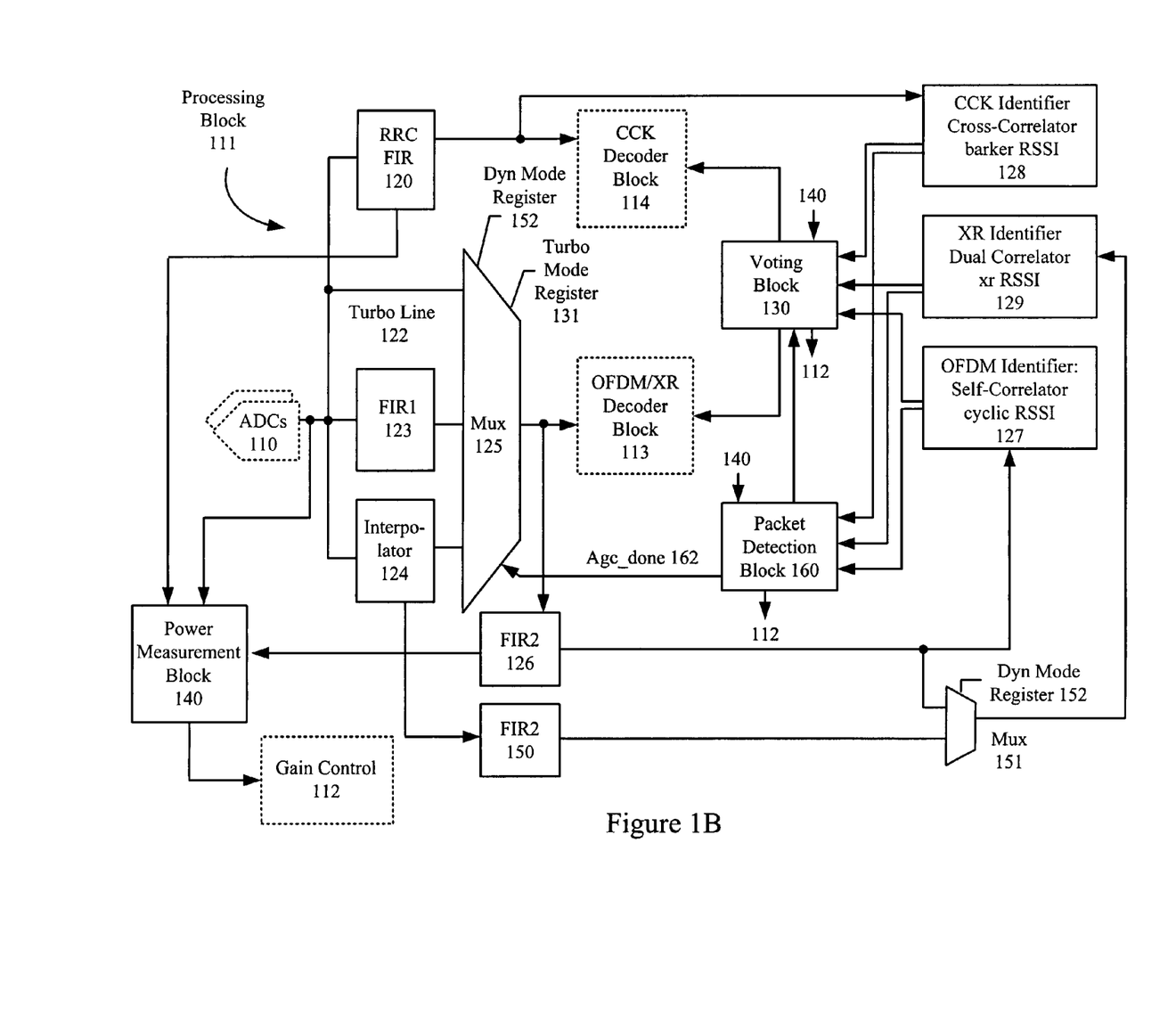
FIG. 1B illustrates a more detailed block diagram of a processing block, which includes a voting block. The voting block can identify the modulation type based on pattern characteristics and modulation-specific received signal strength indicators (RSSIs) associated with the detected signals.

FIG. 1B illustrates processing block 111 in greater detail. For context, ADCs 110, gain control 112, CCK decoder block 114, and OFDM/XR decoder block 113 are shown. As shown in FIG. 1B, ADCs 110 can directly provide an output to a power measurement block 140. In this configuration, power measurement block 140 can determine the magnitude of the detected signal as received by processing block 111. Gain control 112 can use this magnitude to provide coarse adjustments to the gains of the variable amplifiers discussed in reference to FIG. 1A. In one embodiment, coarse gain adjustments are made until the signal is brought within the established high and low thresholds.

As described above, the variable amplifiers can be set to a relatively high gain to ensure that in the absence of in-band signals even thermal noise at the antenna can be detected. Thus, in this case, gain control circuit 112 would typically perform coarse gain adjustments based on strong, not weak, signals. Fine gain adjustments can be performed based on the output of an RRC FIR filter 120 and a FIR2 filter 126 (described in further detail below) to optimize the signal size.

Because the type of modulation of the packet is initially unknown in the 802.11g mode, processing block 111 advantageously allows parallel demodulation of a packet, thereby ensuring the quickest decoding time possible. To provide this parallel demodulation, processing block 111 can provide the output of ADCs 110 to both CCK decoder block 114 and OFDM/XR decoder block 113 via various processing components.

For example, in the case of CCK decoder block 114, RRC FIR filter 120 receives the output of ADCs 110. RRC FIR filter 120 can be used when the sampling rate is identified to be 44 MHz, and the desired data rate is 22 MHz. In other words, RRC filter 120 can be used to provide a down sample of 2 to the output of ADCs 110 as well as to provide matched filter pulse shaping and rejection of out-of-band interference for optimal SNR. After this processing, RRC filter 120 provides the 22 MHz signal to CCK decoder block 121.

In the case of OFDM/XR decoder block 113, a Turbo line 122, a finite impulse response (FIR1) filter 123, and an interpolator 124 all receive the output of ADCs 110 and can provide various levels of OFDM/XR processing to the detected signal. A multiplexer 125, which receives inputs from Turbo line 122, FIR1 filter 123, and interpolator 124, provides its single output to OFDM/XR decoder block 113.

In one embodiment, turbo line 122 can be selected when the sampling rate desired is 80 MHz (i.e. twice as fast as a standard 802.11a signal). In one embodiment, multiplexer 125 selects turbo line 122 only when receiver 100 is in the turbo mode, as determined by a value stored in a turbo mode register 131. In accordance with one feature of the invention, turbo line 122 can have a dual use in receiver 100. Specifically, turbo line 122 can also be selected when the received and desired data rate is 44 MHz. When receiver 100 is in the 802.11g mode, as determined by a value in a dynamic mode register 152, multiplexer 125 selects between turbo line 122 and interpolator 124.

Interpolator 124 can be selected when the received data rate is 44 MHz, and the desired data rate is 40 MHz. Interpolator 124 can be implemented using sequencing interpolator configurations described in U.S. patent application Ser. No. 10/367,527, entitled "RECEIVING AND TRANSMITTING SIGNALS HAVING MULTIPLE MODULATION TYPES USING SEQUENCING INTERPOLATOR", filed on Feb. 14, 2003 by Atheros Communications, Inc., and incorporated by reference herein.

Note that FIR1 filter 123 can be selected when the received data rate is 80 MHz, and the desired data rate is 40 MHz. In other words, FIR1 filter 123 can also be used to provide a down sample of 2 to the output of ADCs 110. This data rate is used for receivers in the 802.11a mode. Thus, in this embodiment, receiver 100 can conform to both 802.11a and 802.11g standards.

In this embodiment of receiver 100, RRC FIR filter 120 and a FIR2 filter 126 (which is coupled to the output of multiplexer 125) provide outputs to power measurement block 140. In this configuration, power measurement block 140 can provide further signal power information to gain control 112, thereby allowing gain control 112 to make additional fine gain adjustments to optimize signal size, if necessary.

FIR2 filter 126 and a FIR2 filter 150 (which is substantially identical to FIR2 filter 126 but receives an output of interpolator 124) can be used to filter out any nearby blocking signals and reject any out-of-band interference for optimal SNR. A multiplexer 151 can selectively provide one of the outputs of FIR2 filter 126 and FIR2 filter 150 to an XR identifier 129. FIR2 filter 126 provides its output to an OFDM identifier 127. RRC FIR filter 120 provides its output to a CCK identifier 128.

In general, identifiers 127, 128, and 129 can provide values to a packet detection block 160 during the search mode and to a voting block 130 during the demodulation mode. Specifically, and described in further detail below, identifiers 127, 128, and 129 can compute normalized power values in the search mode and absolute power modulation-specific RSSI values in the demodulation mode. Of importance, these values are computed based on certain characteristics. Note that the term "characteristic" can refer to any number of identifying means including, for example, patterns and/or periodicity of a given signal.

Characteristics of Modulation Types

Exemplary characteristics of each modulation type will now be discussed. For example, in an OFDM preamble shown in FIG. 2A, twelve tones (complex sinusoidals) are spaced (peak to peak) at 1.25 MHz with a period of 0.8 µs. (Note that self-correlation at 44 MHz sampling rate (if interpolator 146 is not used) will require 35 samples, compared to 32 samples at 40 MHz typically used in 802.11a. Advantageously, 35 samples at a 44 MHz sampling rate spans a period of 795 ns, which has virtually no degradation in performance from an ideal 800 ns self-correlation.

Figure 2A:
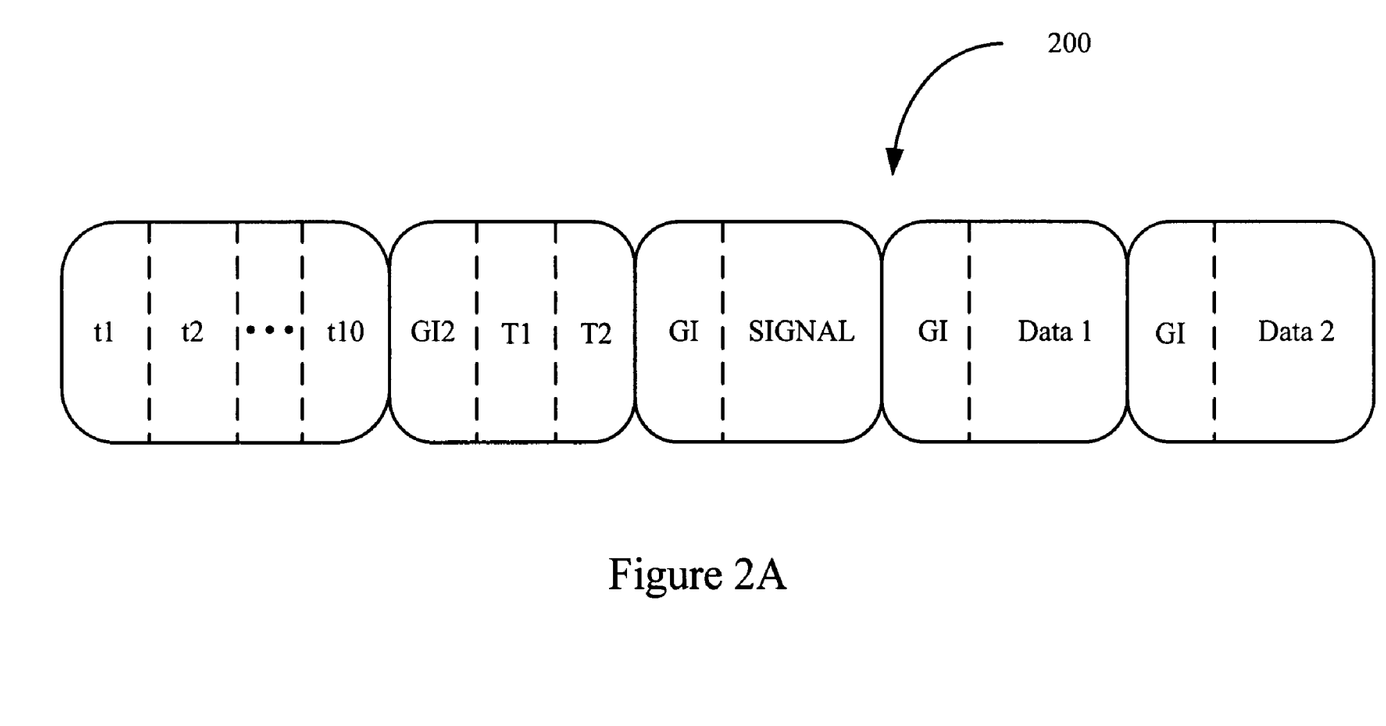
FIG. 2A illustrates an exemplary OFDM modulated signal.

Each of ten short training symbols t1-t10 in the OFDM preamble has these twelve sub-carriers, thereby establishing an OFDM pattern. Therefore, the output will be fully periodic, even in multipath. Thus, looking for periodicity of 0.8 µs is very effective to find the preamble, even in conditions of low signal to noise ratio (SNR) and heavy multipath. Hence, the term "self-correlation" is appropriate in describing OFDM detection.

Figure 2B:
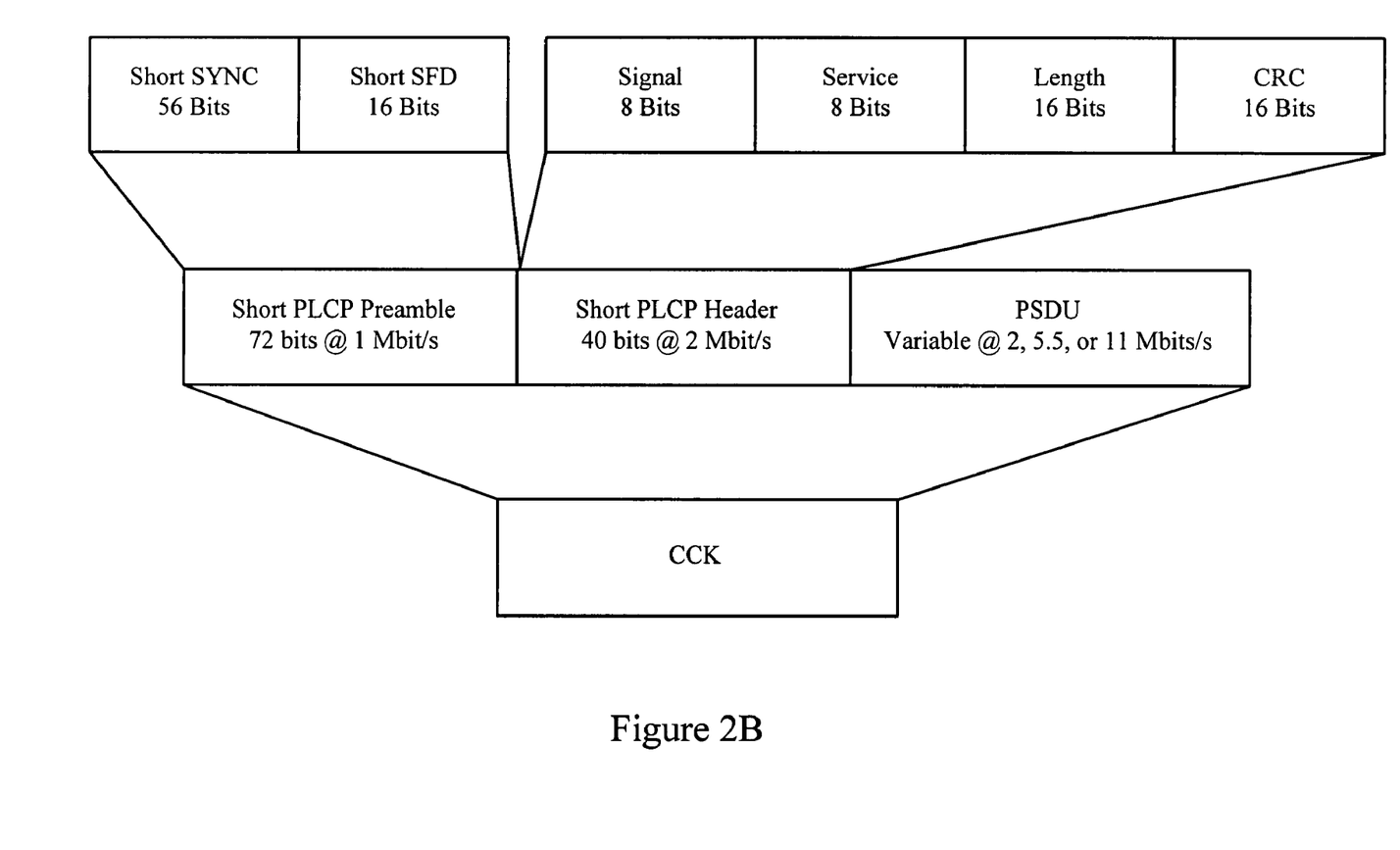
FIG. 2B illustrates an exemplary CCK modulated signal.

In contrast, in a CCK preamble (i.e. a SYNC signal) shown in FIG. 2B, Barker signals (an 11-chip spreading code) are multiplied by either −1 or +1. Note that FIG. 2B illustrates a short CCK format, in contrast to a long CCK format (as defined by the 2001 draft supplement to the IEEE 802.11b standard). However, the −1/+1 multiplication is applied in a similar manner, thereby establishing a CCK pattern. Hence, the term "cross-correlation" is appropriate in describing CCK detection.

In an XR preamble, 15 symbols (called medium sequences) of duration 1.6 µs at the base rate (32 samples at Nyquist rate) are provided. These medium sequences are combined with a secondary PN codes, such that each medium has a predetermined sign (i.e. +/−). Preamble detection operates by cross-correlating the input signal with a single medium sequence, then self-correlating this output over a gap of the duration of a medium sequence. Therefore, an XR signal can have both self- and cross-correlation characteristics.

Operation Modes: Search And Demodulation

Figure 3:
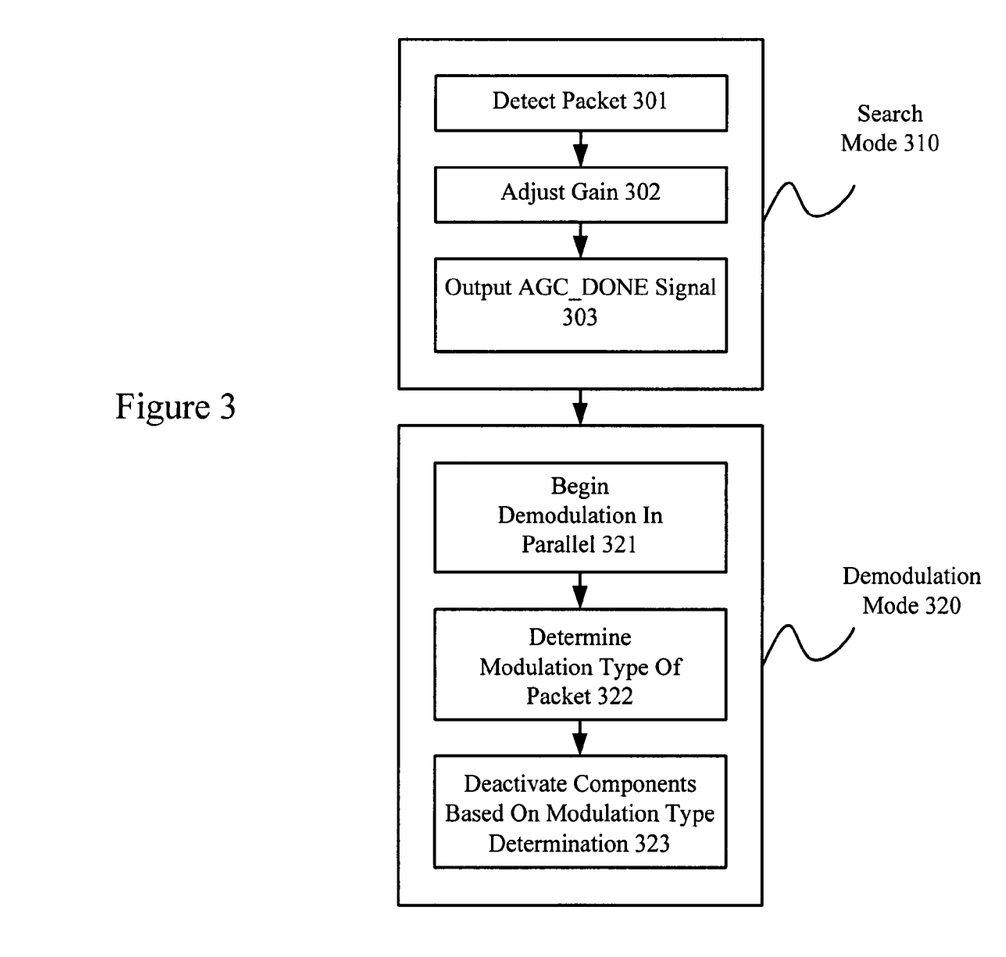
FIG. 3 illustrates an exemplary process that includes a search mode in which the variable gain of amplifiers in the receiver can be adjusted and a demodulation mode in which the modulation type of each packet can be identified.

FIG. 3 illustrates a simplified flow chart of the principal operation modes for processing block 111. In a first operation mode, i.e. a search mode 310, a packet is detected in step 301. In processing block 111 (see FIG. 1B), power measurement block 140 can provide this detection function after receiving the output of ADCs 110. After initial detection, the gain of the variable amplifiers can be adjusted in step 302. Note that this adjustment can include both coarse as well as fine gain adjustment. Gain control 112 can provide such adjustments after receiving one or more inputs from power measurement block 140. When the optimal signal gain is achieved, an appropriate signal is provided to various components of processing block 111. In one embodiment, the signal can be implemented as an agc_done signal (representing an end to automatic gain control). In processing block 111, packet detection block 160 can generate this agc_done signal.

Note that a WLAN receiver conforming to the 802.11g standard (without XR activation) will only receive a 44 MHz signal. Therefore, in search mode 310, turbo line 122 can be selected to transfer its signal to OFDM/XR decoder block 113 and OFDM identifier 127 (via FIR2 filter 126).

In a second operation mode, i.e. a demodulation mode 320, demodulation of the detected packet can begin in step 321. In accordance with one feature of the invention, this demodulation can be done with one or more decoder blocks. For example, in one embodiment of processing block 111, both CCK decoder block 114 as well as OFDM/XR decoder block 113 can initially operate in parallel. In step 322, the modulation type of the packet can be determined. In processing block 111, voting block 130 can perform this function during the preamble of the packet. After the determination of the modulation type, various components in processing block 111 can be deactivated in step 323. In one embodiment, voting block 130 can trigger this deactivation functionality.

Figures 1C, 1D:
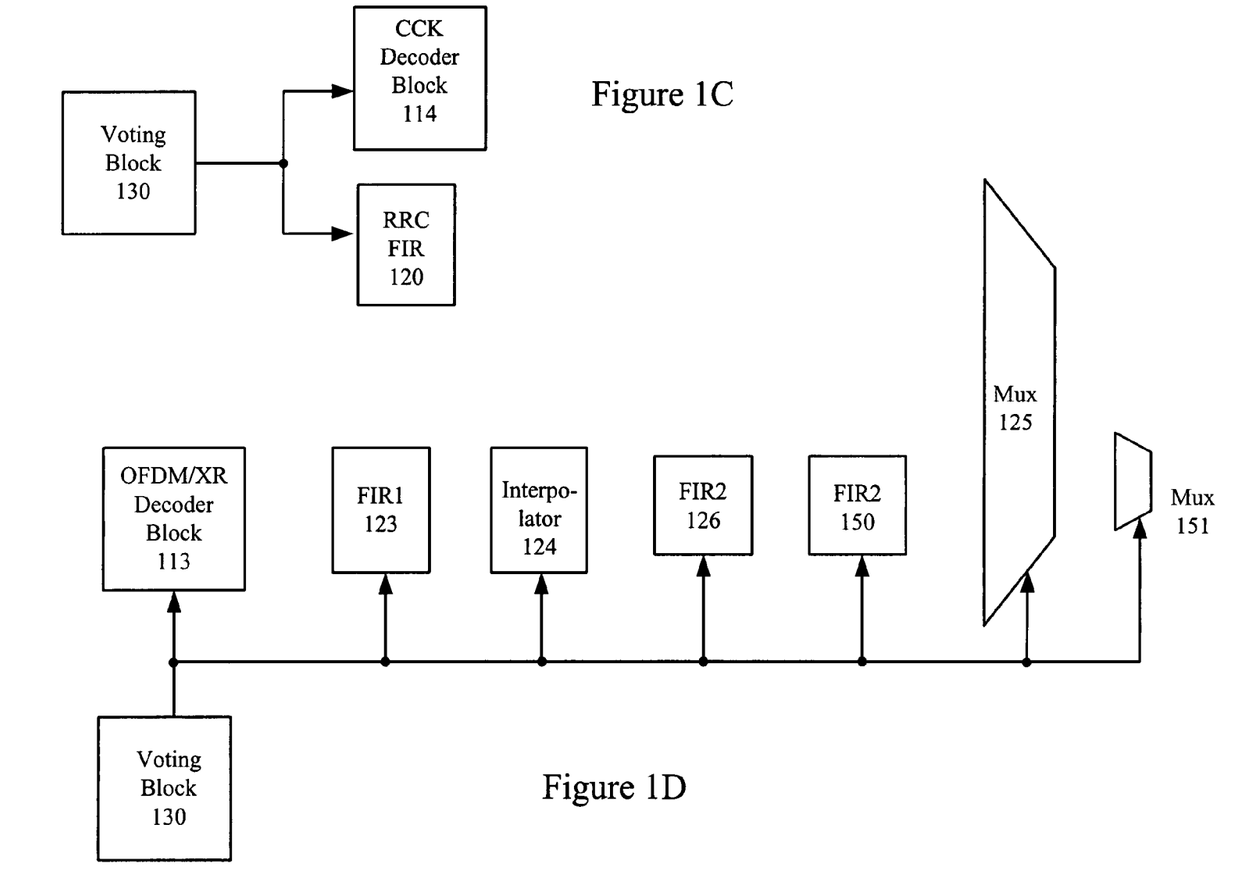
FIGS. 1C and 1D illustrate embodiments of receiver configurations in which a voting block can control various components, including decoder blocks, in the receiver.

For example, referring to FIG. 1C, if an OFDM or XR signal is identified, then any components associated with CCK signals can be deactivated. In processing block 111, these components can include CCK decoder block 114 and RRC FIR filter 120. In one embodiment, voting block 130 can deactivate a gated clock tree, which can deactivate CCK decoder block 114 and RRC FIR filter 120 in parallel. In other embodiments, CCK decoder block 114 and RRC FIR filter 120 can be deactivated in series.

Similarly, referring to FIG. 1D, if a CCK signal is identified, then any components associated with OFDM/XR signals can be deactivated. In processing block 111, these components can include OFDM/XR decoder block 113, FIR1 filter 123, interpolator 124, FIR2 filter 126, FIR2 filter 150, multiplexer 125, and multiplexer 151. In one embodiment, voting block 130 can deactivate OFDM/XR decoder block 113, FIR1 filter 123, interpolator 124, FIR2 filter 126, FIR2 filter 150, multiplexer 125, and multiplexer 151 in parallel. In other embodiments, OFDM/XR decoder block 113, FIR1 filter 123, interpolator 124, FIR2 filter 126, FIR2 filter 150, multiplexer 125, and multiplexer 151 can be deactivated in series.

Moreover, referring back to FIG. 1B, if XR modulated signals will not be received, then interpolator 124, FIR2 filter 150, and multiplexer 151 can all be powered down while still providing a low pass filtering for incoming OFDM signals using turbo line 122 and FIR2 filter 126. If XR modulated signals can be received, then interpolator 124 can be activated. In this case, FIR2 filter 126 will be receiving a 44 MHz signal and FIR2 filter 150 will be receiving a 40 MHz signal.

Packet Detection in Search Mode

As described above, in one embodiment of search mode 310, power management block 140 can detect the signal strength of the received signal and provide the appropriate output to gain control 112. The signal strength can be characterized as weak or strong. For example, if the received signal is equal to or less than a predetermined threshold, then the received signal can be characterized as weak. If the received signal is greater than this predetermined threshold, then the received signal can be characterized as strong.

In another embodiment, different detection mechanisms can be used to detect weak and strong signals. Because it is unknown whether the next packet will be strong or weak, these detection mechanisms can operate in parallel. In one embodiment of the invention, the detection mechanism for a weak signal can include outputs from a cross-correlator, a self-correlator, and a dual correlator. For example, CCK identifier 128, OFDM identifier 127, and XR identifier 129 can implement the detection mechanism for a weak signal and provide their outputs to packet detection block 160. In contrast, the detection mechanism for a strong signal can include an indication of a jump in raw received signal strength indicator (RSSI). In one embodiment, power measurement block 140 can detect this jump and provide that determination to packet detection block 160.

In one embodiment of weak signal detection, a cross-correlation technique for CCK identifier 128 can compare known modulation patterns found in the preamble of the signal with the detected signal. The power of this correlation value can be normalized by the power in the sum of the squares of the samples correlated upon. CCK identifier 128 can provide this normalized value to packet detection block 160, which can then compare this normalized value to a predetermined threshold for CCK modulation (e.g. 0.5). If this normalized correlation exceeds a predetermined threshold, then one or more gain adjustments (i.e. fine gain adjustments) can be performed on the variable amplifiers based on outputs from packet detection block 160 to gain control 112.

A substantially similar procedure could be performed using a self-correlation technique for OFDM identifier 127. In this case, each sample can be multiplied by the conjugate of a sample a fixed number of samples ago and summed for a fixed amount of time. The power of this value can be normalized by the power of the samples used in the self-correction and then compared to another predetermined threshold for OFDM modulation (e.g. 0.45). If this normalized correlation exceeds the predetermined threshold, then one or more gain adjustments (i.e. fine gain adjustments) can be performed on the variable amplifiers.

U.S. patent application Ser. No. 10/666,723, entitled "Packet Detection Synchronization, And Frequency Offset Estimation", U.S. patent application Ser. No. 10/666,953, entitled "Wireless Channel Estimation", and U.S. patent application Ser. No. 10/666,952, entitled "Repetition Coding For A Wireless System", all filed on Sep. 17, 2003 by Atheros Communications, Inc. and incorporated by reference herein, describe aspects of XR signal detection as well as packet detection mechanisms. U.S. patent application Ser. No. 09/849,595, entitled, "Self-Correlation Detection In Automatic Gain Calibration", filed on May 4, 2001 (now U.S. Pat. No. 6,785,523) and also incorporated by reference herein, describes embodiments of power measurement block 140, packet detection block 160, as well as the packet detection mechanisms forming part of identifiers 127-129.

Modulation Identification in Demodulation Mode

In general, voting block 130 chooses the highest probability modulation for decoding the detected packet based on the analysis of the received signal in light of different identification (ID) values. Specifically, one or more of identifiers 127, 128, and 129 can provide an ID value to voting block 130 based on comparing the output signal of its corresponding filter to unique characteristics associated with its modulation type. The ID value indicates the likelihood that the filtered signal is of a certain modulation type.

In one simple embodiment, voting block 130 can determine the highest of the three ID values, thereby designating the most probable modulation type. In other embodiments of the invention described in further detail below, voting block 130 can use the ID values in various algorithms to determine the most probable modulation type. Voting block 130 can advantageously provide its output to CCK decoder 114 and OFDM/XR decoder 113, thereby ensuring that one of the two decoders can be used to properly decode the received signal and the other decoder can be deactivated. In one embodiment, voting block 130 can further provide its output to gain control 112, thereby allowing additional fine adjustment of the gains of RF amplifier 103, IF amplifier 105, and baseband amplifiers 108 (FIG. 1A) based on the modulation of the packet.

Note that to effectively detect and identify the modulation of the received signals, it would be desirable to have a base sampling rate of 20 MHz for OFDM/XR signals and 11 MHz for CCK signals. Because the components of receiver 100 cannot be simultaneously run at both frequencies, only one of the two base sampling rates is used. Therefore, in one embodiment of a WLAN receiver operating in conformance with the 802.11g standard, processing block 111 can be run at 44 MHz. Thus, if voting block 130 determines that an OFDM or XR packet has been received, then interpolator 124 can be used to reduce 44 MHz to 40 MHz.

Signal Modulation Identification (802.11g, XR Disabled)

After receiver 100 (XR capability disabled) detects a signal, makes any appropriate gain adjustment to its variable amplifiers, and asserts the agc_done signal, OFDM identifier 127, CCK identifier 128, and voting block 130 can determine the modulation type of the signal. In one embodiment, this identification is dependent on the strength of the detected signal.

Figure 4A:
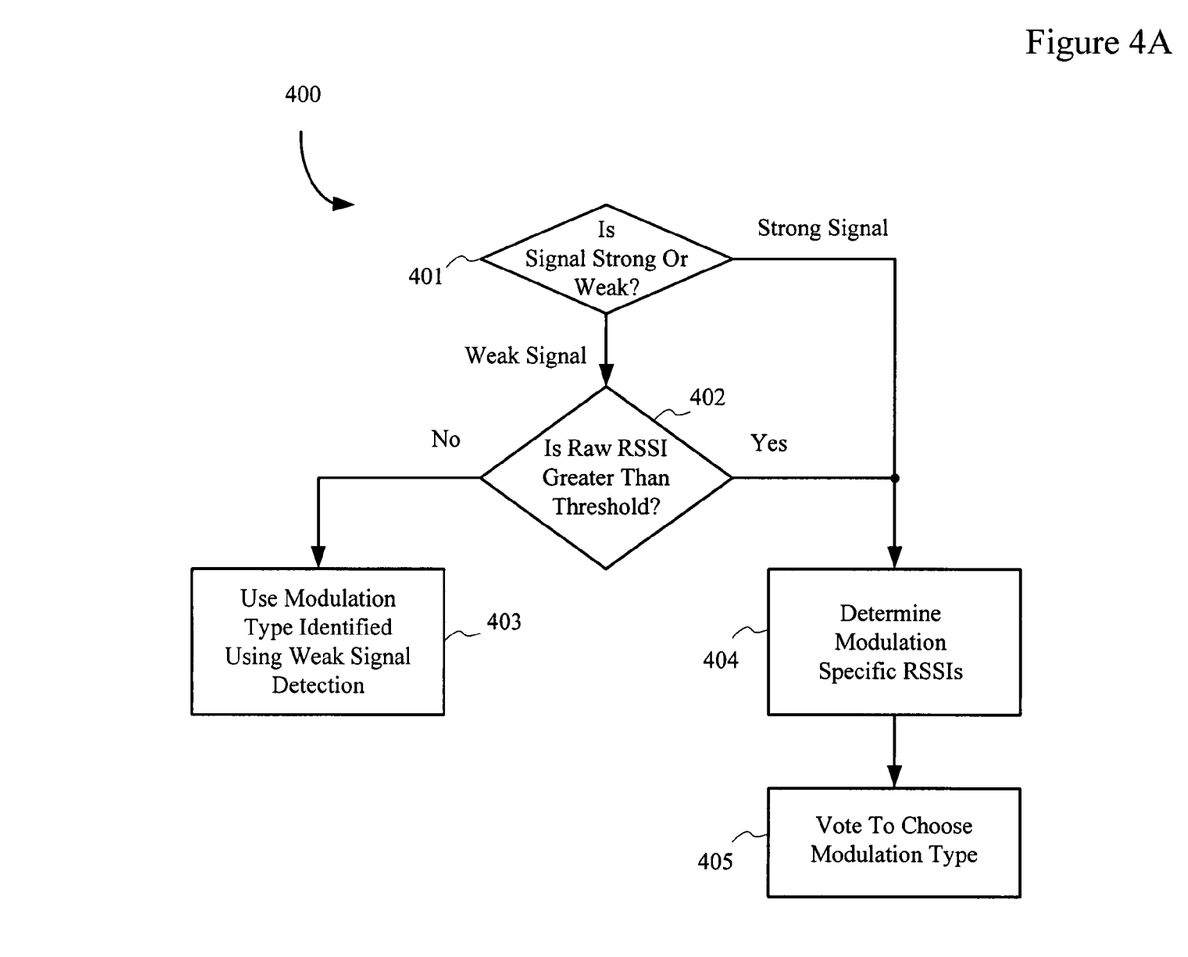
FIGS. 4A and 4B illustrate an exemplary technique that can be used in a WLAN receiver to identify the modulation of a received packet. This technique can include computing a raw RSSI as well as modulation-specific RSSIs.

FIG. 4A illustrates an exemplary technique 400 for determining the modulation type of the detected signal. In step 401, a determination can be made whether the detected signal is strong or weak. In processing block 111 (FIG. 1B), power measurement block 140 can make this determination. If the detected signal is a weak signal, then the raw RSSI of the detected signal can be compared to a threshold RSSI in step 402.

This threshold RSSI can be used to distinguish truly weak signals from intermediate strength signals. Specifically, under certain circumstances, an intermediate strength OFDM signal can initially trigger a CCK identification instead of an OFDM identification. Thus, a threshold RSSI can be used to increase the probability that the correct modulation is identified. Note that this threshold value can be adjusted based on user feedback. For example, if an incorrect modulation type is being consistently identified, then the threshold value can be adjusted accordingly.

If the raw RSSI of the signal is less than the threshold RSSI (i.e. the detected signal is a truly weak signal), then the modulation type indicated during the search mode can be used in step 403. Note that during the search mode, after the first of identifiers 127-129 exceeds its threshold value in weak signal detection, packet detection block 160 notes the identified modulation type and stops the search mode. In one embodiment, packet detection block 160 (FIG. 1B) can provide its modulation identification to voting block 130 during search mode 310. Moreover, power measurement block 140 can compute the values in steps 401 and 402 during search mode 310. In this manner, identification of the most probable modulation type for a weak signal can occur immediately after the agc_done signal is asserted (step 303). In other embodiments, packet detection block 160 (FIG. 1B) can provide its modulation identification to voting block 130 during demodulation mode 320. Moreover, power measurement block 140 can compute the values in steps 401 and 402 during demodulation mode 320.

If packet detection block 160 identifies a weak signal OFDM packet, then voting block 130 can allow OFDM decoder block 113 to continue decoding the packet and advantageously deactivate CCK decoder block 114 (as well as other CCK-related components as discussed in reference to FIG. 1C). Similarly, if packet detection block 160 identifies a weak signal CCK packet, then voting block 130 can allow CCK decoder block 114 to continue decoding the packet and advantageously deactivate OFDM decoder block 113 (and other OFDM-related components as discussed in reference to FIG. 1D).

In one embodiment, if the raw RSSI of the signal is greater than a threshold RSSI (i.e. rssi>weak_vote_thr), then the modulation-specific RSSIs can be computed and voted on in step 404. The modulation-specific RSSIs generated by OFDM identifier 127 and CCK identifier 128 are referenced herein as a cyclic_rssi and a barker_rssi, respectively. Note that an RSSI is typically based on raw power, i.e. unnormalized (sum of squares) power. Because OFDM identifier 127 and CCK identifier 128 might be less than perfect correlators, the power can be accordingly adjusted for each identifier. In a typical embodiment, the power is decreased, i.e. the RSSIs of OFDM correlator 127 and CCK correlator 128 are decreased by the effect of the noise to be less than the sum of squares power.

Note that the modulation-specific RSSI corresponding to the transmitted modulation type would ideally be comparable in value to the raw RSSI, whereas any modulation-specific RSSI not corresponding to the transmitted modulation type would be significantly lower. For example, in one embodiment, the difference in power between the raw RSSI and the modulation-specific RSSI for the correct modulation type can be between 1-4 dB, whereas the modulation-specific RSSI for the incorrect modulation type should be even lower.

To compute the modulation-specific RSSI, an identifier can first perform a noise floor measurement, i.e. a measurement (calibrated or uncalibrated) based on the thermal noise on the medium without a signal. In one embodiment, the noise floor can be computed by subtracting the amount of total variable gain in all amplifiers being used from the measured noise power at ADCs 110 (both values being in dBs). This measurement is described in U.S. patent application Ser. No. 10/254,151, entitled "Method And System for Noise Floor Calibration And Receive Signal Strength Detection", filed on Sep. 25, 2002 by Atheros Communications, Inc., and incorporated by reference herein.

At this point, as shown in the following equation, the RSSI can be computed by subtracting the noise floor as well as the amount of variable gain from the squared magnitude of the correlation after being converted to dBs (i.e. log domain) in a look-up table.

Modulation_specific_$RSSI$=(Log$_{10}$(Correlator_output$^2$)−variable_gain)−noisefloor Thus, for a desired modulation type, the computed modulation-specific RSSI is similar to a signal to noise ratio (SNR), but one that is based on the correlation of the modulation type (i.e. self-correlation for the OFDM identifier and cross-correlation for the CCK identifier).

After computing the modulation-specific RSSIs in step 404, voting block 130, which receives the power output from OFDM identifier 127 and CCK identifier 128, can normalize these RSSIs by the variable gain and then implement an appropriate voting technique in step 405. In one embodiment, voting block 130 can implement a voting technique that determines whether the cyclic_rssi added to a bias value (referenced generically herein as bias_value) is greater than the barker_rssi. The following equation can represent such a voting technique.

cyc_gt_barker=(cyc_rssi+ofdm_cck_bias_value)>barker_rssi

In one embodiment, the bias value can advantageously adjust the probability of choosing different modulated signals in the receiver. Note that this bias value can be computed before signal detection, during search mode 310, or during demodulation mode 320.

In one embodiment, this probability adjustment can take into account different signal environments. For example, if strong multipath is present in the environment, then the barker_rssi degrades more rapidly than the cyclic_rssi. That is, a self-correlation is logically much more immune to multipath effects than a cross-correlation.

Thus, in one embodiment, a default ofdm_cck_bias_value can be set negative. The ofdm_cck_bias_value can be increased relative to the default ofdm_cck bias value to make OFDM more likely and decreased to make CCK more likely. In one embodiment, the default ofdm_cck_bias_value can be set to −3.

If cyc_gt_barker is true, then voting block 130 identifies the signal as an OFDM signal, allows OFDM decoder block 113 to continue decoding the packet, and advantageously deactivates CCK decoder block 114 (as well as other CCK-related components as discussed in reference to FIG. 1C). If cyc_gt_barker is false, then voting block 130 identifies the signal as a CCK signal, allows CCK decoder block 114 to continue decoding the packet, and advantageously deactivates OFDM decoder block 113 (and other OFDM-related components as discussed in reference to FIG. 1D).

Signal Modulation Identification (802.g, XR Enabled)

Some wireless devices can send and receive packets from exceptionally long distances using a modulation called extend range (XR) (proprietary to Atheros Communications, Inc.). In one embodiment, WLAN devices must be XR-enabled to detect and identify XR signals. In simple terms, the XR signal includes distributing repeated values of an 802.11a (OFDM) signal across multiple sub-carriers, thereby decreasing its data rate as well as decreasing the received signal to noise ratio (SNR) required to decode the XR signal.

XR-enabled clients cannot send unsolicited data to the access point. Instead, an access point typically polls these clients to send data. The period between pollings, particularly for XR-enabled clients that are already pushing the boundary of transmission, can be too long.

Therefore, in one embodiment, to reduce the period between pollings, an XR-enabled client can "chirp" to an access point. In one embodiment, a chirp can include an XR header with no accompanying data. In another embodiment, a chirp can include a pair of XR headers concatenated together, i.e. a double chirp, again with no accompanying data.

Thus, the single or double chirp indicates that the XR-enabled client has data to send to the access point. The single or double chirp can further indicate what type of information will be transmitted. After receiving a chirp/double chirp, an access point can respond with another chip, thereby indicating to other XR-enabled clients that they cannot chirp until a predetermined time has lapsed. At this point, the access point will schedule a polling of the first chirp XR-enabled client as soon as possible.

Of importance, the access point must also be XR-enabled to communicate with similarly enabled clients. In one embodiment, the MAC of the access point can decide which type of signal that processing block ill should look for by setting its XR mode bits, called an xr_chirp_mode. Table 1 indicates the supported packet types in 802.11a mode when extended range is enabled.

TABLE 1

Packet Types In 802.11a Mode, XR Enabled

| XR_chirp_mode | Possible Packet Types |
| --- | --- |
| 00 | OFDM packet or XR packet |
| 01 | Single Chirp |
| 10 | OFDM packet or Double Chirp |
| 11 | Invalid |

Table 2 indicates the supported packet types in 802.11g mode when extended range is enabled. Note that in one embodiment, when the WLAN device operates in the 802.11b mode, extended range modulation is disabled.

TABLE 2

Packet Types In 802.11g Mode Including XR Modulation

| Rx_chirp_mode | Possible Packet Types |
| --- | --- |
| 00 | OFDM packet or XR packet |
| 01 | Single Chirp |
| 10 | OFDM packet, CCK packet, or Double Chirp |
| 11 | Invalid |

As described above, the XR signal includes unique characteristics in its header, thereby facilitating identification of a weak XR signal using a combined self- and cross-correlation. Specifically, weak signal identification of XR signals can be performed using the 15 symbols (i.e. the medium sequences) in the XR preamble. As noted previously, these medium sequences are combined with a secondary PN codes, such that each medium sequence has a predetermined sign (i.e. +/−). Thus, XR signal identification can be performed by cross-correlating the detected signal with a single medium sequence, then self-correlating this output over a gap of the duration of a medium sequence. Because of the long duration of the XR preamble and the complexity of this cross- and self-correlation, XR identifier 129 could take between 24-48 μs for identification of a weak XR signal. In one embodiment, because such time constraints, the XR modulation type identification in the demodulation mode 320 can be limited to a cross-correlation of one medium sequence without sacrificing significant accuracy.

To implement step 405 (FIG. 4) when receiver 100 is in the "00" XR_chirp_mode or the "00" Rx_chirp_mode, processing block 111 can determine whether the signal is OFDM or extended range by comparing the cyclic_rssi and the XR RSSI. Specifically, voting block 130 can implement a voting technique that determines whether an OFDM RSSI added to a bias RSSI is greater than an XR RSSI. The voting technique can be represented by the following equation:

$$cyc\_gt\_xr = (cyc\_rssi + ofdm\_xr\_bias\_value > extended\_range\_rssi).$$

Note that the bias value ofdm_xr_bias_value serves substantially the same purpose as the ofdm_cck_bias_value. That is, the ofdm_xr_bias_value can advantageously account for the probability associated with encountering OFDM and XR signals in different environments. The bias value can be increased to make OFDM identification more likely or decreased to make XR identification more likely. In one embodiment, the ofdm_xr_bias_value can be based on 64 samples, which can be a subset of the preamble, thereby advantageously reducing the time to identify the signal.

If cyc_gt_xr is true, then the detected signal is identified as an OFDM signal. Otherwise, the signal is identified as an XR signal.

To implement step 405 (FIG. 4) when receiver 100 is in the "01" XR_chirp_mode or the "01" Rx_chirp_mode, no voting is necessary and receiver 100 is merely notified that only detection of chirps is needed. Similarly, when receiver 100 is in the "10" XR_chirp_mode, no voting is necessary. In this case, receiver 100 starts the decoding of that signal in parallel paths assuming both OFDM modulation and XR modulation. If an XR double chirp is detected at a later point in time, then the process aborts the OFDM decoding and proceeds with an XR transmission.

In contrast, when receiver 100 is in the "10" Rx_chirp_mode (i.e. the packet type could be OFDM, CCK, or double chirp, as shown in Table 2), distinguishing between a CCK and an XR signal in heavy multipath can pose significant challenges. Specifically, in contrast to a pure self-correlation found in an OFDM signal (and thus not degrading under multipath conditions), both CCK and XR signals (which include cross-correlation properties) can degrade rapidly under multipath conditions.

Figure 4B:
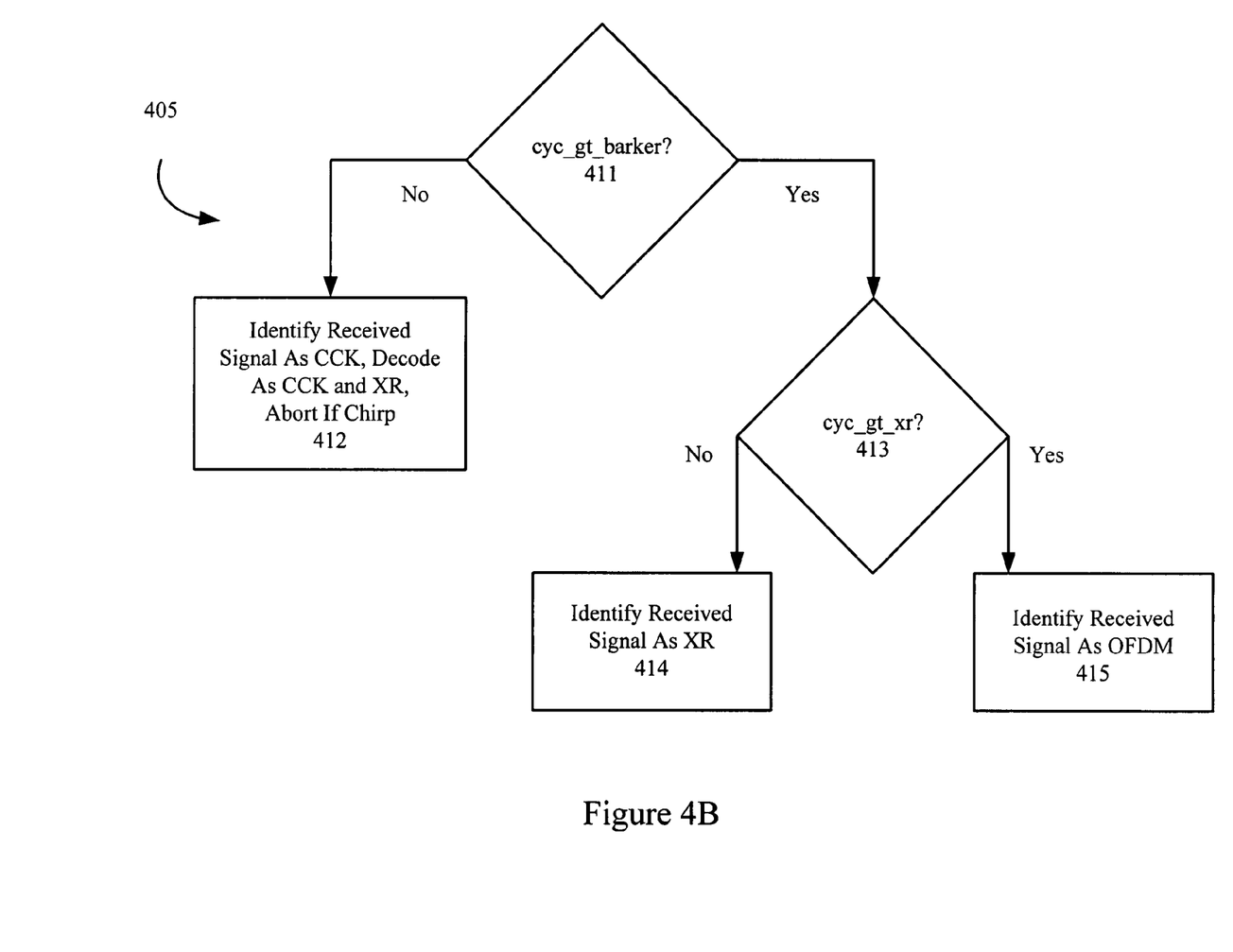

Therefore, in one embodiment, the voting technique can include comparing the OFDM RSSI and the CCK RSSI and then, if necessary, comparing the OFDM RSSI and the XR RSSI. FIG. 4B illustrates an exemplary implementation of step 405 to provide such comparisons. For example, step 411 can determine whether the OFDM RSSI added to a bias value is greater than the CCK RSSI (i.e. cyc_gt_barker). The following equation describes this voting technique:

$$cyc\_gt\_barker = (cyc\_rssi + ofdm\_cck\_bias\_value) > barker\_rssi$$

If cyc_gt_barker is not true, then the voting block identifies the signal as a CCK signal and starts the decoding of that signal in parallel paths assuming both CCK modulation and XR modulation in step 412. At this point, if an XR double chirp is detected, then the process aborts the CCK decoding and proceeds with an XR decoding.

If cyc_gt_barker is true, then step 413 determines whether the OFDM RSSI added to a bias value is greater than the XR RSSI (i.e. cyc_gt_xr). The following equation describes this voting technique:

$$cyc\_gt\_xr = (cyc\_rssi + ofdm\_xr\_bias\_value > extended\_range\_rssi).$$

If cyc_gt_xr is not true, then the voting block identifies the signal as an XR signal in step 414 and begins a decoding of the signal based on XR modulation. If cyc_gt_xr is true, then the voting block identifies the signal as an OFDM signal and begins a decoding of the signal based on OFDM modulation in step 415.

OTHER EMBODIMENTS

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, as described above, a bias value can be used based on a specific environment and a signal's response in that environment. In another embodiment, the bias value can reflect a user's bias in wanting to identify certain type of signals. For example, a user may prioritize receiving OFDM signals and not CCK. In that case, the bias value can be used to increase the probability of identifying OFDM signals at the expense of identifying CCK signals.

In one embodiment, a system for determining a modulation of a received signal in a receiver is also provided. The system can include means for providing an identification value for one or more potential types of modulation based on the received signal. The system can further include means for determining the most probable modulation based on such identification values. Other components of the system can provide other functions described in reference to FIGS. 1B, 3, 4A, and 4B.

In another embodiment including an appropriately fast microprocessor, a computer software program for determining a modulation of a received signal can also be provided. The program can include code for providing an identification value for one or more potential types of modulation based on the received signal. The program can further include code for determining the most probable modulation based on such identification values. Other code of the program can implement other functions described in reference to FIGS. 1B, 3, 4A, and 4B.

Note that in one embodiment, CCK identifier 128 can be implemented as part of CCK decoder block 114. Similarly, OFDM identifier and XR identifier can be implemented as part of OFDM/XR decoder block 113. In another embodiment, gain control 112 and packet detection block 160 can be integrally implemented. In yet another embodiment, voting block 130 and packet detection block 160 can be integrally implemented.

In another embodiment, an intermediate signal detection can trigger CCK identifier 128 to analyze and generate results regarding multiple portions of the received signal, thereby correcting for an early misidentification. For example, CCK identifier 128 can calculate the coherent sum of two consecutive normalized Barker correlations, wherein if the sum exceeds a predetermined threshold value (i.e. weak_sig_thr_cck), then CCK identifier 128 can send its output to voting block 130. Otherwise, CCK identifier 128 provides no output to voting block 130. In this manner, CCK identifier 128 can advantageously prevent erroneous detection of barker signals.

Accordingly, it is intended that the scope of the invention be defined by the following Claims and their equivalents.

The invention claimed is:

1. A method of determining a modulation type of a received signal, the method comprising:
   beginning demodulation of the received signal using components associated with each potential type of modulation;
   providing an identification value to a voting block for each potential type of modulation based on the received signal; and
   using a technique in the voting block to determine the modulation type, wherein the technique is based at least on the identification values and including determining a strength of the received signal,
   wherein if the strength of the received signal is equal to or less than a predetermined threshold value, thereby characterizing the received signal as weak, then the identification value includes a normalized correlation value based on characteristics of the modulation type.

2. The method of claim 1, wherein if the strength of the received signal is greater than the predetermined threshold value, thereby characterizing the received signal as strong or intermediate, then the identification value includes an absolute modulation-specific correlation value.

3. The method of claim 1, wherein if the strength of the received signal is greater than the predetermined threshold value, thereby characterizing the received signal as strong or intermediate, then the identification value includes a modulation-specific received signal strength indicator (RSSI).

4. The method of claim 3, wherein the modulation-specific RSSI is computed by:
   performing a noise floor measurement; and
   determining the strength of the received signal above the noise floor measurement.

5. The method of claim 3, wherein the technique includes computing a bias value, wherein the bias value adjusts a probability of choosing a particular modulation.

6. The method of claim 5, wherein the bias value is based at least on an environment of the received signal.

7. The method of claim 6, wherein the environment includes multipath.

8. A method of determining a modulation type of a received signal, the method comprising:
   beginning demodulation of the received signal using components associated with each potential type of modulation;
   providing an identification value to a voting block for each potential type of modulation based on the received signal; and
   using a technique in the voting block to determine the modulation type, wherein the technique is based at least on the identification values and including determining a strength of the received signal,
   wherein if the strength of the received signal is equal to or less than a predetermined threshold value, thereby characterizing the received signal as a weak signal, then a determination can be made whether a raw RSSI is greater than a threshold RSSI.

9. The method of claim 8, wherein if the strength of the received signal is greater than the predetermined threshold value, thereby characterizing the received signal as a strong signal, or if the raw RSSI is greater than the threshold RSSI, thereby characterizing the received signal as an intermediate signal, then the identification value includes a modulation-specific correlation value.

10. The method of claim 8, wherein if the raw RSSI is less than the threshold RSSI, then the identification value includes a normalized correlation value.

11. A method of conserving power while optimizing signal demodulation in a wireless local area network (WLAN) receiver, the method comprising:
    beginning demodulation of a received signal using receiver components associated with each potential type of modulation;
    providing an identification value to a voting block of the receiver for each potential type of modulation based on the received signal;
    using a technique in the voting block to determine an actual modulation of the received signal, wherein the technique is based at least on the identification values and depends on a strength of the received signal; and
    deactivating receiver components associated with modulations other than that of the determined modulation,
    wherein if the strength of the received signal is equal to or less than a predetermined threshold value, thereby characterizing the received signal as weak, then the identification value includes a normalized correlation value based on characteristics of the potential type of modulation.

12. The method of claim 11, wherein the identification value includes an absolute modulation-specific correlation value.

13. The method of claim 11, wherein if the strength of the received signal is greater than the predetermined threshold value, thereby characterizing the received signal as strong or intermediate, then the identification value includes a modulation-specific received signal strength indicator (RSSI).

14. The method of claim 13, wherein the technique includes computing a bias value, wherein the bias value adjusts a probability of choosing a particular modulation.

15. A system for determining a modulation of a received signal in a receiver, the system comprising:
    modulator identifiers for providing identification values for potential types of modulation based on the received signal;
    means for determining a strength of the received signal; and
    a voting block for determining the modulation, wherein the voting block uses a technique based at least on the identification values and the strength of the received signal,
    wherein the means for determining the strength controls whether the voting block uses a correlation value or an RSSI based on a type of modulation for the identification value.

16. The system of claim 15, wherein at least one of the modulator identifiers includes means for generating a normalized correlation value based on characteristics of the type of modulation.

17. The system of claim 15, wherein at least one of the modulator identifiers includes means for computing an absolute modulation-specific correlation value.

18. The system of claim 15, wherein the means for determining the strength further includes means for determining whether a raw received signal indicator (RSSI) is greater than a threshold RSSI.

19. The system of claim 17, wherein the means for computing the absolute modulation-specific correlation includes:
   means for performing a noise floor measurement; and
   means for determining a strength of the received signal above the noise floor measurement.

20. The system of claim 19, wherein the means for computing the absolute modulation-specific correlation includes means for adding a bias value, wherein the bias value adjusts a probability of choosing a particular modulation.

21. The system of claim 20, further including means for determining an environment of the received signal, wherein the means for determining an environment provides an output to the means for computing the bias value.

* * * * *